US012767878B2

(12) United States Patent
Alhamad et al.

(10) Patent No.: US 12,767,878 B2
(45) Date of Patent: Oct. 20, 2026

(54) DOWNHOLE SLUDGE REMOVAL

(71) Applicant: Saudi Arabian Oil Company, Dhahran (SA)

(72) Inventors: Luai A. Alhamad, Dammam (SA); Basil M. Alfakher, Dhahran (SA); Sajjad Aldarweesh, Safwa (SA); Eiman Hassan Al Munif, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/767,464

(22) Filed: Jul. 9, 2024

(65) Prior Publication Data

US 2026/0015538 A1 Jan. 15, 2026

(51) Int. Cl.
*E21B 37/00* (2006.01)
*C09K 8/524* (2006.01)

(52) U.S. Cl.
CPC .............. *C09K 8/524* (2013.01); *E21B 37/00* (2013.01)

(58) Field of Classification Search
CPC ................................ C09K 8/524; E21B 37/00
See application file for complete search history.

(56) References Cited

U.S. PATENT DOCUMENTS

2012/0234548 A1* 9/2012 Dyer ....................... E21B 37/06 507/260
2013/0112106 A1* 5/2013 Malwitz ................... C09K 8/54 106/14.44
2014/0113843 A1* 4/2014 Shumway ................ C09K 8/74 507/261
2017/0218261 A1* 8/2017 Nguyen .................. E21B 43/25
2020/0270505 A1* 8/2020 Reddy .................... C09K 8/703
2021/0024809 A1* 1/2021 Ba Geri ................. C09K 8/032
2021/0340433 A1* 11/2021 Smith ...................... C09K 8/54

OTHER PUBLICATIONS

Alhamad et al., "Organic Acids for Stimulation Purposes: A Review," SPE-199291-PA, SPE Production & Operation, Nov. 2020, 35(4):952-978, 27 pages.

Al-Taq et al., "Downhole Sludge: Formation, Characterization and Removal," IPTC-21321-MS, paper presented at the International Petroleum Technology Conference, Virtual, Mar. 23-Apr. 1, 2021, 21 pages.

(Continued)

*Primary Examiner* — Silvana C Runyan
(74) *Attorney, Agent, or Firm* — Fish & Richardson P.C.

(57) ABSTRACT

A composition can be used for downhole dissolution of a hydrocarbon sludge in a subterranean formation. The composition includes an organic solvent, a surfactant, an organic acid, and a mutual solvent. The organic solvent is configured to dissolve at least a first portion of an organic phase of the hydrocarbon sludge. The organic acid is configured to dissolve at least a portion of an inorganic phase of the hydrocarbon sludge. The surfactant and the organic acid are synergistically configured to increase solubility of the hydrocarbon sludge upon exposure to the composition. The mutual solvent is soluble in oil and in water. The mutual solvent is configured to dissolve at least a second portion of the organic phase of the hydrocarbon sludge. The mutual solvent is configured to increase solubility of the organic acid in the composition.

5 Claims, 4 Drawing Sheets

(56) References Cited

OTHER PUBLICATIONS

Al-Taq et al., "From Lab to Field: An Integrated Approach to Successfully Restore the Productivity of Damaged Wells with Organic Deposition," SPE-183539-MS, paper presented at the Abu Dhabi International Petroleum Exhibition & Conference, Abu Dhabi, UAE, Nov. 7-10, 2016, 19 pages.

Al-Taq et al., "Organic/Inorganic Deposition in Oil Producing Wells from Carbonate Reservoirs: Mechanisms, Removal and Mitigation," SPE-177447-MS, prepared for presentation at the Abu Dhabi International Petroleum Exhibition and Conference held in Abu Dhabi, UAE, Nov. 9-12, 2015, 15 pages.

Martyushev et al., "Development and application of a double action acidic emulsion for improved oil well performance: laboratory tests and field trials," Colloids and Surfaces A: Physicochemical and Engineering Aspects, Mar. 5, 2021, 612, 125998, 11 pages.

Mohamed et al., "Remediation of Well Impaired by Complex Organic Deposits Embedded with Naphthenate and Contaminated with Inorganics," OTC-26524-MS, prepared for presentation at the Offshore Technology Conference Asia held in Kuala Lumpur, Malaysia, Mar. 22-25, 2016, 11 pages.

* cited by examiner

DOWNHOLE SLUDGE REMOVAL

TECHNICAL FIELD

This disclosure relates to downhole sludge removal for improving production of fluids.

BACKGROUND

Production fluid typically comes from wells in the form of a complex mixture of three phases (oil, water, and gas) that are co-mingled together. In some cases, a small quantity of solids (such as sand particles and/or precipitates) may also be present in the production fluid. Precipitated hydrocarbon sludge can include organic and inorganic solids. For example, organic solids that can be present in hydrocarbon sludge can include asphaltene, paraffin, wax, or any combinations of these. In some cases, mixing incompatible brines can induce inorganic nucleation sites for organic deposition which can accumulate hydrocarbon sludge. Precipitated hydrocarbon sludge can adversely affect flow assurance in wells. In extreme cases, complete plugging of producing lines can result from accumulation of precipitated hydrocarbon sludge.

Sludge removal treatments for subterranean formations can include dissolution of an organic phase and of an inorganic phase of the sludge. Some conventional sludge removal treatments include introduction of an organic solvent fluid for addressing the organic phase, followed by an acid stage for addressing the inorganic phase. Treatments that include only a single-stage treatment can be favorable over two-stage treatments, due to the reduced requirement of treatment materials, operation time, and additional associated expenses. Conventional single-stage treatments can, however, be associated with the risk of incomplete removal of the inorganic phase of the sludge.

SUMMARY

This disclosure describes technologies relating to downhole sludge removal for improving production of fluids. Certain aspects of the subject matter described can be implemented as a method for dissolving a hydrocarbon sludge within a wellbore in a subterranean formation. The method comprises flowing a treatment fluid into the wellbore to a downhole location within the subterranean formation. The hydrocarbon sludge is an obstruction located at the downhole location that hinders flow of fluids within the wellbore. The treatment fluid comprises an organic solvent, a surfactant, an organic acid, and a mutual solvent that is soluble in oil and in water. The mutual solvent increases solubility of the organic acid in the treatment fluid. The surfactant and the organic acid synergistically increase solubility of the hydrocarbon sludge upon exposure to the treatment fluid. The method comprises maintaining the treatment fluid at the downhole location for a specified soaking time duration to dissolve the hydrocarbon sludge located at the downhole location, thereby removing the obstruction within the wellbore. The organic solvent dissolves at least a first portion of an organic phase of the hydrocarbon sludge. The mutual solvent dissolves at least a second portion of the organic phase of the hydrocarbon sludge. The organic acid dissolves at least a portion of an inorganic phase of the hydrocarbon sludge.

This, and other aspects, can include one or more of the following features. In some implementations, the organic solvent comprises xylene, toluene, heavy naphtha, or any combinations of these. In some implementations, the treatment fluid comprises about 45 weight percent (wt. %) to about 55 wt. % of the organic solvent. In some implementations, the mutual solvent comprises ethylene glycol monobutyl ether (EGBE), methanol, isopropyl alcohol, or any combinations of these. In some implementations, the treatment fluid comprises about 10 wt. % to about 20 wt. % of the mutual solvent. In some implementations, the surfactant comprises a sulfate, a sulfonate, a phosphate, a phosphonate, or any combinations of these. In some implementations, the treatment fluid comprises about 0.2 wt. % to about 0.5 wt. % of the surfactant. In some implementations, the treatment fluid comprises a carrier fluid comprising diesel. In some implementations, the treatment fluid comprises about 20 wt. % to about 50 wt. % of the carrier fluid. In some implementations, the organic acid comprises acetic acid, formic acid, lactic acid, or any combinations of these. In some implementations, the treatment fluid comprises about 5 wt. % to about 13 wt. % of the organic acid. In some implementations, the specified soaking time duration is in a range of about 2 hours to about 24 hours. In some implementations, the treatment fluid flowed into the wellbore to the downhole location at a pill volume in a range of about 5 gallons per foot (gal/ft) to about 15 gal/ft of the height of the downhole location at which the hydrocarbon sludge is located.

Certain aspects of the subject matter described can be implemented as a composition for downhole dissolution of a hydrocarbon sludge in a subterranean formation. The composition comprises an organic solvent configured to dissolve at least a first portion of an organic phase of the hydrocarbon sludge. The composition comprises a surfactant. The composition comprises an organic acid configured to dissolve at least a portion of an inorganic phase of the hydrocarbon sludge. The surfactant and the organic acid are synergistically configured to increase solubility of the hydrocarbon sludge upon exposure to the treatment fluid. The composition comprises a mutual solvent that is soluble in oil and in water. The mutual solvent is configured to dissolve at least a second portion of the organic phase of the hydrocarbon sludge. The mutual solvent is configured to increase solubility of the organic acid in the composition.

This, and other aspects, can include one or more of the following features. In some implementations, the organic solvent comprises xylene, toluene, heavy naphtha, or any combinations of these. In some implementations, the composition comprises about 45 wt. % to about 55 wt. % of the organic solvent. In some implementations, the mutual solvent comprises ethylene glycol monobutyl ether (EGBE), methanol, isopropyl alcohol, or any combinations of these. In some implementations, the composition comprises about 10 wt. % to about 20 wt. % of the mutual solvent. In some implementations, the surfactant comprises a sulfate, a sulfonate, a phosphate, a phosphonate, or any combinations of these. In some implementations, the composition comprises about 0.2 wt. % to about 0.5 wt. % of the surfactant. In some implementations, the composition comprises a carrier fluid comprising diesel. In some implementations, the composition comprises about 20 wt. % to about 50 wt. % of the carrier fluid. In some implementations, the organic acid comprises acetic acid, formic acid, lactic acid, or any combinations of these. In some implementations, the composition comprises about 5 wt. % to about 13 wt. % of the organic acid. In some implementations, the composition comprises: about 45 wt. % to about 55 wt. % of the organic solvent, in which the organic solvent comprises xylene, toluene, heavy naphtha, or any combinations of these; about 0.2 wt. % to about 0.5 wt. % of the surfactant, in which the surfactant comprises a sulfate, a sulfonate, a phosphate, a phosphonate, or any combinations of these; about 5 wt. % to about 13 wt. % of the organic acid, in which the organic acid comprises acetic acid, formic acid, lactic acid, or any combinations of these; about 10 wt. % to about 20 wt. % of the mutual solvent, in which the mutual solvent comprises ethylene glycol monobutyl ether (EGBE), methanol, isopropyl alcohol, or any combinations of these; and about 20 wt. % to about 50 wt. % of a carrier fluid comprising diesel.

Certain aspects of the subject matter described can be implemented as a system. The system comprises a wellbore formed in a subterranean formation. The wellbore extends at least to a downhole location within the subterranean formation. A hydrocarbon sludge is located at the downhole location. The system comprises a coiled tubing extending from a surface location and into the wellbore. The system comprises a pump configured to flow a treatment fluid through the coiled tubing and to the downhole location. The system comprises the treatment fluid. The treatment fluid is configured to dissolve the hydrocarbon sludge. The treatment fluid comprises an organic solvent configured to dissolve at least a first portion of an organic phase of the hydrocarbon sludge. The treatment fluid comprises a surfactant. The treatment fluid comprises an organic acid configured to dissolve at least a portion of an inorganic phase of the hydrocarbon sludge. The surfactant and the organic acid are synergistically configured to increase solubility of the hydrocarbon sludge upon exposure to the treatment fluid. The treatment fluid comprises a mutual solvent that is soluble in oil and in water. The mutual solvent is configured to dissolve at least a second portion of the organic phase of the hydrocarbon sludge. The mutual solvent is configured to increase solubility of the organic acid in the composition.

This, and other aspects, can include one or more of the following aspects. In some implementations, the organic solvent comprises xylene, toluene, heavy naphtha, or any combinations of these. In some implementations, the treatment fluid comprises about 45 wt. % to about 55 wt. % of the organic solvent. In some implementations, the mutual solvent comprises ethylene glycol monobutyl ether (EGBE), methanol, isopropyl alcohol, or any combinations of these. In some implementations, the treatment fluid comprises about 10 wt. % to about 20 wt. % of the mutual solvent. In some implementations, the surfactant comprises a sulfate, a sulfonate, a phosphate, a phosphonate, or any combinations of these. In some implementations, the treatment fluid comprises about 0.2 wt. % to about 0.5 wt. % of the surfactant. In some implementations, the organic acid comprises acetic acid, formic acid, lactic acid, or any combinations of these. In some implementations, the treatment fluid comprises about 5 wt. % to about 13 wt. % of the organic acid.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

The present disclosure provides sludge removal treatments for subterranean formations. The sludge removal treatments described in this disclosure can be implemented as single-stage treatments that removes sludge, while eliminating the risk of incomplete removal of the sludge. This disclosure describes a sludge removal treatment which includes a single stage treatment that includes injection of a composition that includes a mutual solvent, an organic solvent, and a surfactant. In some implementations, the mutual solvent enhances removal of the organic phase of sludge and also enhances organic acid solubility in the composition. The organic solvent can facilitate removal of the organic phase of the sludge, such as asphaltene, paraffin, and wax. In some implementations, the surfactant preserves wettability and enhances organic acid solubility in the composition. The composition of the present disclosure includes an organic acid. In some implementations, as the organic acid is acetic acid. The organic acid facilitates removal of the inorganic phase of sludge. For example, acetic acid can remove carbonate scale through a hydrogen ion attack mechanism. The composition of the present disclosure can include a carrier fluid, such as diesel. The carrier fluid can reduce the loading of the relatively more costly organic solvent. The composition can be used as a single stage treatment, which requires less steps and potentially less time to successfully perform sludge removal treatments in comparison to conventional methods that typically include at least two stages of treatments. It was found that the presence of the surfactant and the acetic acid in the composition exhibited synergistic effects of increasing solubility of the sludge for removing such sludge.

The subject matter described in this disclosure can be implemented in particular implementations, so as to realize one or more of the following advantages. The described downhole sludge removal can be implemented as a single-stage treatment, which can be more cost effective and more efficient in comparison to multi-stage treatments, to effectively remove obstruction(s) caused by the sludge. The inclusion of both an organic acid and an ionic surfactant in the described treatment fluids can synergistically increase solubility of downhole sludge, thereby improving the sludge removal process.

Figure 1:
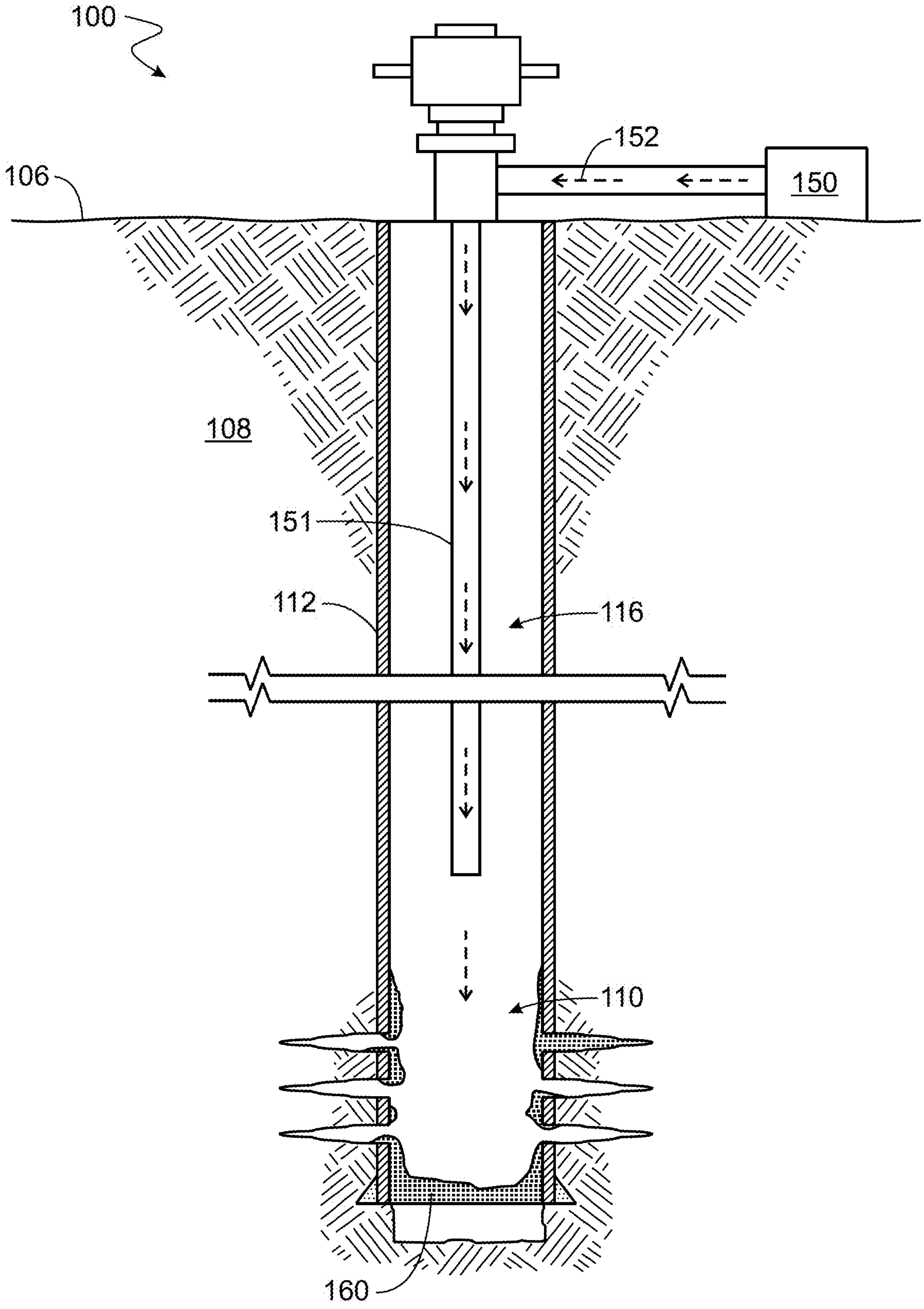
FIG. 1 is a schematic diagram of an example well that includes sludge obstructing a portion of the wellbore of the well.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing hydrocarbon gas (such as natural gas) from the subterranean zones of interest 110 to the surface 106. While termed a "gas well," the well need not produce only dry gas, and may incidentally or in much smaller quantities, produce liquid including oil, water, or both. In some implementations, the well 100 is an oil well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached to the wellhead. The Christmas tree includes valves used to regulate flow into or out of the well 100. In particular, casing 112 is commercially produced in a number of common sizes specified by the American Petroleum Institute (the "API"), including 4-½, 5, 5-½, 6, 6-⅝, 7, 7-⅝, 7-¾, 8-⅝, 8-¾, 9-⅝, 9-¾, 9-⅞, 10-¾, 11-¾, 11-⅞, 13-⅜, 13-½, 13-⅝, 16, 18-⅝, and 20 inches, and the API specifies internal diameters for each casing size.

In some cases, a hydrocarbon sludge 160 is located at a downhole location (such as the zone of interest 110). The sludge 160 can include, for example, an organic phase, an inorganic phase, or both. The organic phase of the sludge 160 can include, for example, asphaltene, paraffin, wax, sludge from an oil-based drilling mud, or any combinations of these. The inorganic phase of the sludge 160 can include, for example, inorganic scale, such as calcite ($CaCO_3$), dolomite ($CaMg(CO_3)_2$), iron siderite ($FeCO_3$), or any combinations of these. The presence of the sludge 160 within the well 100 can cause severe problems in the production of fluid by the well 100 to the surface 106. In extreme cases, the sludge 160 can cause complete plugging of tubing in the well 100.

In some implementations, a pump 150 is connected to a tubing string 151 (such as a coiled tubing) that extends from the surface 106 downhole into the wellbore. The pump 150 can be configured to flow a treatment fluid 152 through the tubing string 151 to a downhole location (such as the zone of interest 110). The treatment fluid 152 is configured to dissolve the sludge 160. After flowing the treatment fluid 152 (for example, by the pump 150 through the tubing string 151) to the zone of interest 110, the treatment fluid 152 can be maintained at the zone of interest 110 for a specified soaking time duration that is sufficient to dissolve substantially all of the sludge 160 located at the zone of interest 110, thereby effectively removing the obstruction/plugging from the well 100. In some implementations, the specified soaking time duration is in a range of about 2 hours to about 24 hours. In some implementations, the pump 150 flows the treatment fluid 152 through the tubing string 151 to the zone of interest 110 at a pumping rate in a range of about 2 barrels per minute (about 0.3 cubic meters per minute ($m^3$/min)) to about 4 barrels per minute (about 0.6 $m^3$/min). In some implementations, a pill volume of the treatment fluid 152 that is flowed into the wellbore to the zone of interest 110 is in a range of about 5 gallons per foot (0.06 cubic meters per meter ($m^3$/m)) to about 15 gallons per foot (about 0.19 $m^3$/m) of the height of the downhole location (zone of interest 110) at which the sludge 160 is located.

The treatment fluid 152 includes an organic solvent, a surfactant, an organic acid, and a mutual solvent. The organic solvent of the treatment fluid 152 is configured to dissolve at least a portion (for example, a first portion) of the organic phase of the sludge 160. The organic acid of the treatment fluid 152 is configured to dissolve at least a portion of the inorganic phase (for example, carbonate scale) of the sludge 160. The mutual solvent of the treatment fluid 152 is soluble in both oil and water. The mutual solvent of the treatment fluid 152 is configured to dissolve at least a portion (for example, a second portion) of the organic phase of the sludge 160. The mutual solvent of the treatment fluid 152 is configured to increase solubility of the organic acid in the treatment fluid 152. The surfactant and the organic acid of the treatment fluid 152 are synergistically configured to increase solubility of the sludge 160 upon exposure to the treatment fluid 152.

The organic solvent of the treatment fluid 152 is configured to dissolve asphaltenes that may be present in the sludge 160. The organic solvent of the treatment fluid 152 can be or include, for example, an aromatic hydrocarbon. In some implementations, the organic solvent of the treatment fluid 152 includes a mixture of aromatic hydrocarbons. For example, the organic solvent of the treatment fluid 152 can include xylene, toluene, para-cymene, (polyethyl)benzene, heavy aromatic naphtha, kerosene, or any combinations of these. In some implementations, the treatment fluid 152 includes about 45 weight percent (wt. %) to about 55 wt. % of the organic solvent.

The surfactant of the treatment fluid 152 is configured to provide a water-wetting effect (that is, shift of a rock surface toward water-wet) and is thermally stable in the treatment fluid 152 being applied to dissolve the sludge 160. By being thermally stable, the surfactant of the treatment fluid 152 maintains its performance (e.g., as a surfactant and providing water-wetting effect) and does not decompose upon exposure to typical downhole temperatures (e.g., about 150 degrees Fahrenheit (° F.) (65.6 degrees Celsius (° C.) to about 450° F. (232.2° C.)). The surfactant of the treatment fluid 152 can be or include an anionic (negatively charged) surfactant. The surfactant of the treatment fluid 152 can be or include, for example, a sulfate, a sulfonate, a phosphate, a phosphonate, or any combinations of these. The surfactant of the treatment fluid 152 can be or include a cationic (positively charged) surfactant. The surfactant of the treatment fluid 152 can be or include, for example, an amine, a quaternary ammonium compound, or both. The surfactant of the treatment fluid 152 can be or include a non-ionic (neutral) surfactant. The surfactant of the treatment fluid 152 can be or include, for example, ethylene oxide (or polymer derived from ethylene oxide), propylene oxide (or polymer derived from propylene oxide), alkanolamine condensate, an amine oxide, or any combinations of these. In some implementations, the treatment fluid 152 includes about 0.2 wt. % to about 0.5 wt. % of the surfactant.

The organic acid of the treatment fluid 152 has an acid dissociation constant that is small but also sufficient for promoting slow reaction(s) with carbonate scale (for example, calcite, dolomite, and iron siderite). In some implementations, the organic acid of the treatment fluid 152 has a $pK_a$ value ($pK_a = -\log_{10} K_a$, where $K_a$ is the acid dissociation constant) in a range of about 2 to about 5. For example, the organic acid of the treatment fluid 152 has a $pK_a$ value of about 4.76. The organic acid of the treatment fluid 152 can be or include, for example, acetic acid, formic acid, lactic acid, or any combinations of these. When included in the treatment fluid 152, the organic acid can be provided at an acid concentration in a range of 3 wt. % to 11 wt. %, 3 wt. % to 10 wt. %, or 3 wt. % to 9 wt. % (such as about 5 wt. %), as opposed to being provided as pure (100 wt. %) acid. In some implementations, the treatment fluid 152 includes about 5 wt. % to about 13 wt. % of the organic acid (which can have an acid concentration in a range of 3 wt. % to 11 wt. % itself). For example, the treatment fluid 152 can include about 5 wt. % to about 13 wt. % of an acetic acid solution having an acetic acid concentration of about 5 wt. %. The presence of both the organic acid and the surfactant in the treatment fluid 152 can synergistically improve solubility of the sludge 160 (both organic and inorganic phases of the sludge 160) for effectively removing the obstruction in the well 100.

The organic acid of the treatment fluid 152 can dissolve at least a portion of the inorganic phase of the sludge 160, for example, through the hydrogen ion attack mechanism. For simplicity and clarity, the following description of the hydrogen ion attack mechanism is provided in relation to acetic acid, but similar concepts are also applicable to different acids (such as formic acid and lactic acid) for dissolving the inorganic phase of the sludge 160. Initially, acetic acid ($CH_3COOH$) dissociates into a hydrogen ion and acetate, as shown in Equation 1. Then, hydrogen ions interact with carbonate scale (such as calcite) to initiate a reaction that results in generation of calcium ions, water, and carbon dioxide, as shown in Equation 2. Greater solubility of calcium carbonate scale can result in an increase in calcium ion concentration in solution.

$$CH_3COOH \longleftrightarrow H^+ + CH_3COO^- \quad (1)$$

$$2H^+ + CaCO_3 \longleftrightarrow Ca^{2+} + H_2O + CO_2 \quad (2)$$

The mutual solvent of the treatment fluid 152 facilitates miscibility of the organic acid in the bulk solution of the treatment fluid 152. The mutual solvent of the treatment fluid 152 can be or include, for example, ethylene glycol monobutyl ether (EGBE), methanol, isopropyl alcohol, or any combinations of these. In some implementations, the treatment fluid 152 includes about 10 wt. % to about 20 wt. % of the mutual solvent.

In some implementations, the treatment fluid 152 includes a carrier fluid. The carrier fluid can, for example, be a hydrocarbon fluid that is compatible with the other components of the treatment fluid 152 (such as the organic solvent, surfactant, organic acid, and mutual solvent) and can reduce the loading of the organic solvent (which can be expensive). If included in the treatment fluid 152, the carrier fluid is compatible with existing pumping equipment and surface handling procedures. In cases in which the treatment fluid 152 includes the carrier fluid, the carrier fluid can be selected as a hydrocarbon solvent that is less costly in comparison to the organic solvent of the treatment fluid 152. For example, the carrier fluid of the treatment fluid 152 can be or include diesel. In some implementations, the diesel (carrier fluid) can replace at least a portion of the organic solvent of the treatment fluid 152, thereby reducing the amount of the organic solvent needed in the treatment fluid 152. In some implementations, inclusion of the diesel (carrier fluid) in the treatment fluid 152 allows for reduction in the amount of organic solvent included in the treatment fluid 152. In some implementations, the treatment fluid 152 includes about 20 wt. % to about 50 wt. % of the carrier fluid.

Figure 2:
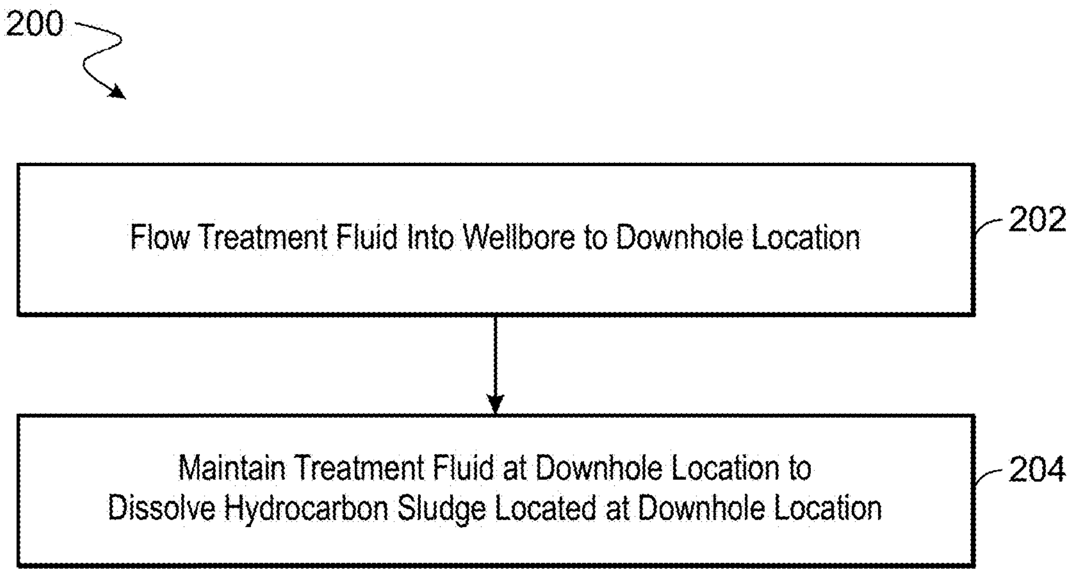
FIG. 2 is a flow chart of an example method for dissolving sludge within a wellbore.

FIG. 2 is a flow chart of an example method 200 for dissolving a hydrocarbon sludge (such as the sludge 160) within a wellbore formed in a subterranean formation (such as the wellbore of the well 100). At block 202, a treatment fluid (such as the treatment fluid 152) is flowed into the wellbore to a downhole location within the subterranean formation (such as the zone of interest 110). The sludge 160 is an obstruction located at the zone of interest 110. The sludge 160 hinders flow of fluids within the wellbore. As described previously, the treatment fluid 152 includes an organic solvent, a surfactant, an organic acid, and a mutual solvent. The treatment fluid 152 can be flowed into the wellbore to the zone of interest 110 at block 202, for example, by the pump 150 and through the tubing string 151. In some implementations, the pump 150 flows the treatment fluid 152 through the tubing string 151 to the zone of interest 110 at a pumping rate in a range of about 2 barrels per minute (about 0.3 cubic meters per minute ($m^3$/min)) to about 4 barrels per minute (about 0.6 $m^3$/min) at block 202. In some implementations, the treatment fluid 152 is flowed into the wellbore to the zone of interest 110 at a pill volume in a range of about 5 gallons per foot (0.06 cubic meters per meter ($m^3$/m)) to about 15 gallons per foot (about 0.19 $m^3$/m) of the height of the downhole location (zone of interest 110) at which the sludge 160 is located. For example, if a vertical height of the zone of interest 110 at which the sludge 160 is located is 2 meters, then the treatment fluid 152 can have a pill volume in a range of about 0.12 cubic meters to about 0.37 cubic meters (as one example, 0.2 cubic meters). At block 204, the treatment fluid

152 is maintained at the zone of interest 110 for a specified soaking time duration to dissolve the sludge 160 located at the zone of interest 110, thereby removing the obstruction within the wellbore. In some implementations, the specified soaking time duration at block 204 is in a range of about 2 hours to about 24 hours.

Examples

Figure 3:
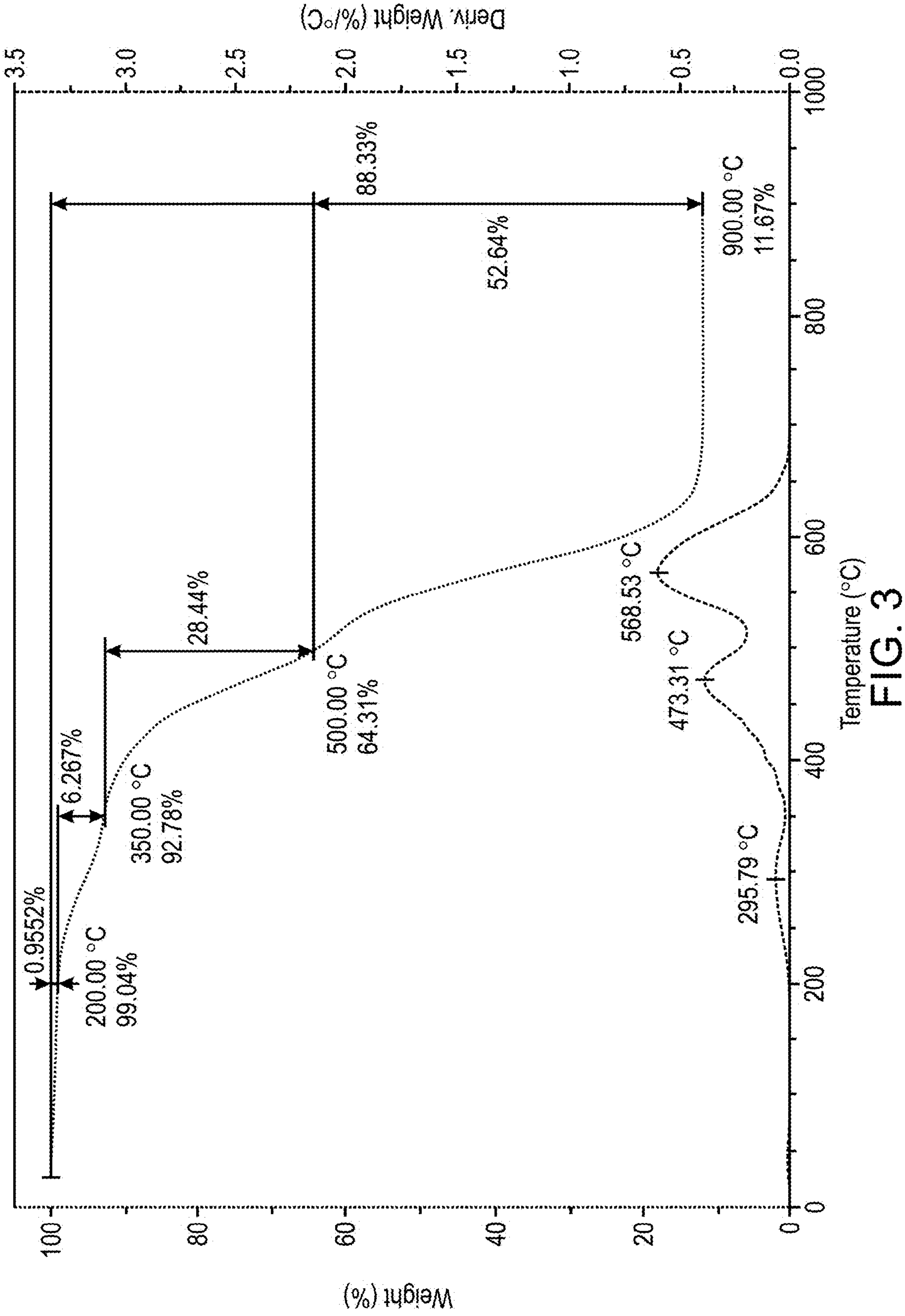
FIG. 3 is a plot of a thermogravimetric analysis of a sludge sample.

Solubility tests were conducted on a sludge sample using a treatment fluid including acetic acid and a treatment fluid excluding acetic acid. The sludge sample was mainly asphaltene, along with a small portion (14 wt. %) of carbonate material. Characterization of the sludge was conducted using thermogravimetric analysis (TGA) and X-ray diffraction (XRD). TGA analysis revealed that 35 wt. % of the sludge decomposed below 500° C., meaning 35 wt. % of the sludge can be attributed to moisture and light hydrocarbons (also shown in Table 1). Further decomposition in the TGA analysis revealed that 88 wt. % of the sludge decomposed up to 900° C. The 12 wt. % residual material of the sludge can be attributed to the inorganic material present in the sludge (which approximately correlates to the 14 wt. % carbonate material). FIG. 3 shows the results of the TGA analysis in graphical form. The composition of the remaining 12 wt. % inorganic material was determined by XRD, and the results of the XRD analysis are shown in Table 2. As shown in Table 2, a majority of the inorganic material comprises dolomite and calcite.

TABLE 1

TGA analysis of sludge sample

| Weight loss at 350° C. | Weight loss from 350° C. to 500° C. | Weight loss from 500° C. to 900° C. | Total weight loss at 900° C. | Residual at 900° C. |
|---|---|---|---|---|
| 7 wt. % | 28 wt. % | 53 wt. % | 88 wt. % | 12 wt % |

TABLE 2

XRD analysis of residual material after dissolution of organic phase of sludge sample

| Component | Weight percent (wt. %) |
|---|---|
| Dolomite ($MgCa(CO_3)_2$) | 41 |
| Calcite ($CaCO_3$) | 40 |
| Gypsum ($CaSO_4•(H_2O)_2$) | 3 |
| Quartz ($SiO_2$) | 1 |
| Talc-1A ($Mg_3Si_4O_{10}(OH)_2$) | 6 |
| Anhydrite ($CaSO_4$) | 9 |

Table 3 provides the composition of the treatment fluid that included acetic acid. The units for the quantities of components shown in Table 3 are gallons per thousand gallon (gpt), which can also be considered parts per thousand on a volume basis. When included in the treatment fluid, acetic acid was provided at an acetic acid concentration of 5 wt. % (diluted with deionized water), instead of pure acetic acid. 100 gpt of acetic acid shown in Table 3 is therefore 100 gpt of 5 wt. % acetic acid, as opposed to 100 gpt of pure (100 wt. %) acetic acid. Solubility tests were conducted at a weight of sludge sample to volume of treatment fluid ratio of 1:10. The solubility tests were conducted at 50° C. for two hours. The remaining undissolved material was aged and then filtered through 0.45 micron filter paper. Solubility was determined based on the initial weight of the sludge ($w_0$) and final weight of the remaining undissolved material ($w_f$). Table 4 shows the compositions of each of the four treatment fluids tested, along with the solubility of the sludge with respect to the four treatment fluids. The solubilities reported in Table 4 are represented by the weight percent of the sludge that was dissolved by the respective treatment fluid $$\left(\frac{w_0-w_f}{w_0}\right).$$

Figure 4:
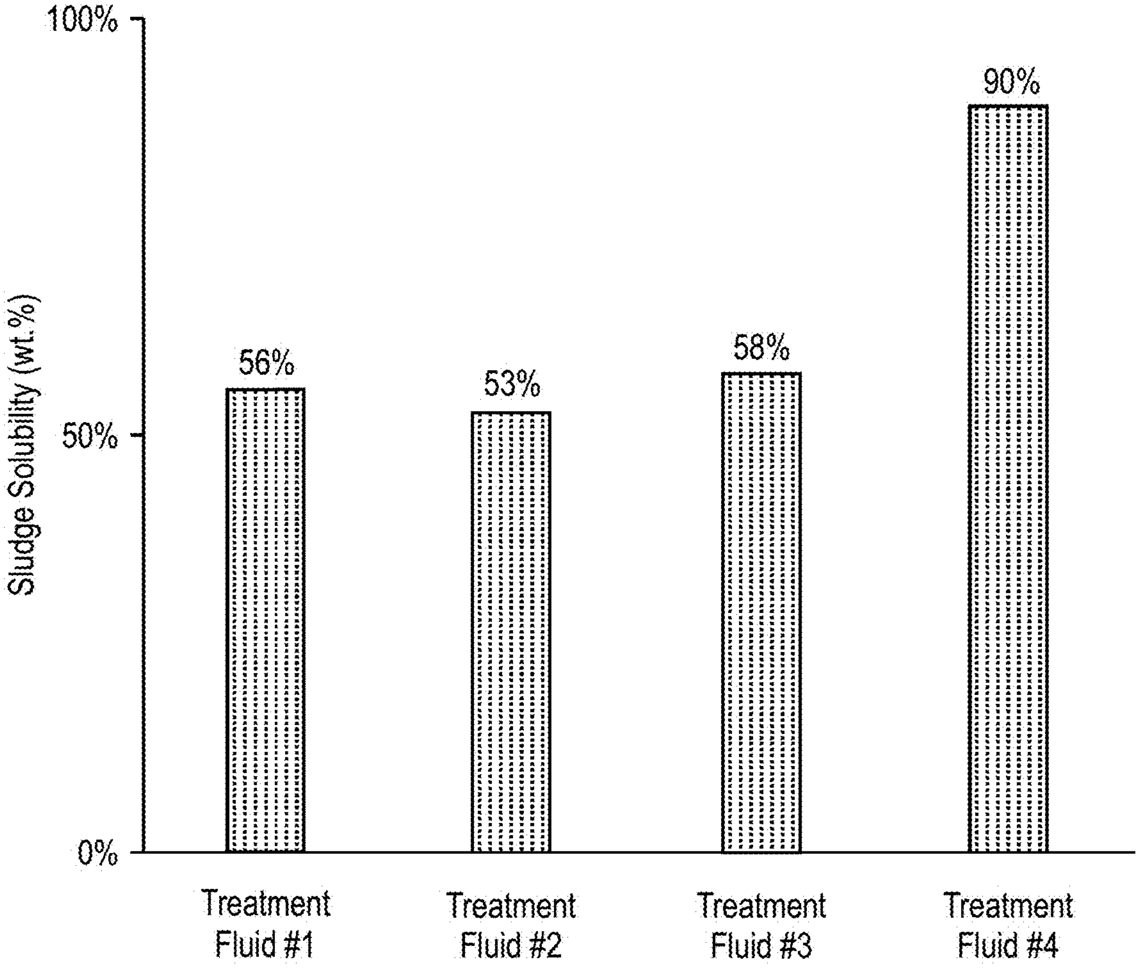
FIG. 4 is a bar graph comparing solubilities of sludge samples exposed to different treatment fluids.

The results shown in Table 4 reveal that in the absence of acetic acid and cationic surfactant (Treatment Fluid #1), the solubility of the sludge sample was 56 wt. %. Addition of acetic acid (Treatment Fluid #3) or surfactant (Treatment Fluid #2), separately, did not improve solubility of the sludge by a significant amount. As shown in Table 4, addition of acetic acid (without surfactant) resulted in sludge solubility of 58 wt. %, while addition of surfactant (without acetic acid) resulted in sludge solubility of 53 wt. %. However, addition of both acetic acid and surfactant (Treatment Fluid #4) significantly increased sludge solubility to 90 wt. %. The results shown in Table 4 reveal the synergistic effect of including both acetic acid and surfactant in the treatment fluid to dissolve sludge that includes both organic and inorganic material. FIG. 4 depicts the solubility results provided in Table 4 in the form of a bar graph, for emphasizing the significant synergistic effect of including both acetic acid and surfactant in the treatment fluid to dissolve sludge that includes both organic and inorganic material.

TABLE 3

Composition of treatment fluid

| Component | Quantity (gpt) |
|---|---|
| Carrier fluid (diesel) | 250 * |
| Organic solvent | 547 |
| Mutual solvent | 100 |
| Acetic acid (5 wt. %) | 100 ** |
| Surfactant | 3 ** |

* 350 when acetic acid is not included
** When included

TABLE 4

Solubility of sludge upon exposure to various treatment fluids

| Treatment Fluid | #1 | #2 | #3 | #4 |
|---|---|---|---|---|
| Additives | Diesel<br>Organic Solvent<br>Mutual Solvent<br>—<br>— | Diesel<br>Organic Solvent<br>Mutual Solvent<br>—<br>Surfactant | Diesel<br>Organic Solvent<br>Mutual Solvent<br>Acetic Acid (5 wt. %)<br>— | Diesel<br>Organic Solvent<br>Mutual Solvent<br>Acetic Acid (5 wt. %)<br>Surfactant |
| Sludge Solubility | 56 wt. % | 53 wt. % | 58 wt. % | 90 wt. % |

Embodiments

In an example implementation (or aspect), a method for dissolving a hydrocarbon sludge within a wellbore in a subterranean formation, the method comprises: flowing a treatment fluid into the wellbore to a downhole location within the subterranean formation, wherein the hydrocarbon sludge is an obstruction located at the downhole location that hinders flow of fluids within the wellbore, wherein the treatment fluid comprises an organic solvent, a surfactant, an organic acid, and a mutual solvent that is soluble in oil and in water, wherein the mutual solvent increases solubility of the organic acid in the treatment fluid, and wherein the surfactant and the organic acid synergistically increase solubility of the hydrocarbon sludge upon exposure to the treatment fluid; and maintaining the treatment fluid at the downhole location for a specified soaking time duration to dissolve the hydrocarbon sludge located at the downhole location, thereby removing the obstruction within the wellbore, wherein the organic solvent dissolves at least a first portion of an organic phase of the hydrocarbon sludge, wherein the mutual solvent dissolves at least a second portion of the organic phase of the hydrocarbon sludge, and wherein the organic acid dissolves at least a portion of an inorganic phase of the hydrocarbon sludge.

In an example implementation (or aspect) combinable with any other example implementation (or aspect), the organic solvent comprises xylene, toluene, heavy naphtha, or any combinations thereof, wherein the treatment fluid comprises about 45 weight percent (wt. %) to about 55 wt. % of the organic solvent.

In an example implementation (or aspect) combinable with any other example implementation (or aspect), the mutual solvent comprises ethylene glycol monobutyl ether (EGBE), methanol, isopropyl alcohol, or any combinations thereof, wherein the treatment fluid comprises about 10 wt. % to about 20 wt. % of the mutual solvent.

In an example implementation (or aspect) combinable with any other example implementation (or aspect), the surfactant comprises a sulfate, a sulfonate, a phosphate, a phosphonate, or any combinations thereof, wherein the treatment fluid comprises about 0.2 wt. % to about 0.5 wt. % of the surfactant.

In an example implementation (or aspect) combinable with any other example implementation (or aspect), the treatment fluid comprises a carrier fluid comprising diesel, wherein the treatment fluid comprises about 20 wt. % to about 50 wt. % of the carrier fluid.

In an example implementation (or aspect) combinable with any other example implementation (or aspect), the organic acid comprises acetic acid, formic acid, lactic acid, or any combinations thereof, wherein the treatment fluid comprises about 5 wt. % to about 13 wt. % of the organic acid.

In an example implementation (or aspect) combinable with any other example implementation (or aspect), the specified soaking time duration is in a range of about 2 hours to about 24 hours.

In an example implementation (or aspect) combinable with any other example implementation (or aspect), the treatment fluid flowed into the wellbore to the downhole location at a pill volume in a range of about 5 gallons per foot (gal/ft) to about 15 gal/ft of the height of the downhole location at which the hydrocarbon sludge is located.

In an example implementation (or aspect), a composition for downhole dissolution of a hydrocarbon sludge in a subterranean formation, the composition comprises: an organic solvent configured to dissolve at least a first portion of an organic phase of the hydrocarbon sludge; a surfactant; an organic acid configured to dissolve at least a portion of an inorganic phase of the hydrocarbon sludge, wherein the surfactant and the organic acid are synergistically configured to increase solubility of the hydrocarbon sludge upon exposure to the treatment fluid; and a mutual solvent that is soluble in oil and in water, wherein the mutual solvent is configured to dissolve at least a second portion of the organic phase of the hydrocarbon sludge, wherein the mutual solvent is configured to increase solubility of the organic acid in the composition.

In an example implementation (or aspect) combinable with any other example implementation (or aspect), the organic solvent comprises xylene, toluene, heavy naphtha, or any combinations thereof, wherein the composition comprises about 45 wt. % to about 55 wt. % of the organic solvent.

In an example implementation (or aspect) combinable with any other example implementation (or aspect), the mutual solvent comprises ethylene glycol monobutyl ether (EGBE), methanol, isopropyl alcohol, or any combinations thereof, wherein the composition comprises about 10 wt. % to about 20 wt. % of the mutual solvent.

In an example implementation (or aspect) combinable with any other example implementation (or aspect), the surfactant comprises a sulfate, a sulfonate, a phosphate, a phosphonate, or any combinations thereof, wherein the composition comprises about 0.2 wt. % to about 0.5 wt. % of the surfactant.

In an example implementation (or aspect) combinable with any other example implementation (or aspect), the composition comprises a carrier fluid comprising diesel, wherein the composition comprises about 20 wt. % to about 50 wt. % of the carrier fluid.

In an example implementation (or aspect) combinable with any other example implementation (or aspect), the organic acid comprises acetic acid, formic acid, lactic acid, or any combinations thereof, wherein the composition comprises about 5 wt. % to about 13 wt. % of the organic acid.

In an example implementation (or aspect) combinable with any other example implementation (or aspect), the composition comprises: about 45 wt. % to about 55 wt. % of the organic solvent, wherein the organic solvent comprises xylene, toluene, heavy naphtha, or any combinations thereof; about 0.2 wt. % to about 0.5 wt. % of the surfactant, wherein the surfactant comprises a sulfate, a sulfonate, a phosphate, a phosphonate, or any combinations thereof; about 5 wt. % to about 13 wt. % of the organic acid, wherein the organic acid comprises acetic acid, formic acid, lactic acid, or any combinations thereof; about 10 wt. % to about 20 wt. % of the mutual solvent, wherein the mutual solvent comprises ethylene glycol monobutyl ether (EGBE), methanol, isopropyl alcohol, or any combinations thereof; and about 20 wt. % to about 50 wt. % of a carrier fluid comprising diesel.

In an example implementation (or aspect), a system comprises: a wellbore formed in a subterranean formation, wherein the wellbore extends at least to a downhole location within the subterranean formation, wherein a hydrocarbon sludge is located at the downhole location; a coiled tubing extending from a surface location and into the wellbore; a pump configured to flow a treatment fluid through the coiled tubing and to the downhole location; and the treatment fluid, wherein the treatment fluid is configured to dissolve the hydrocarbon sludge and comprises: an organic solvent configured to dissolve at least a first portion of an organic phase of the hydrocarbon sludge; a surfactant; an organic acid configured to dissolve at least a portion of an inorganic phase of the hydrocarbon sludge, wherein the surfactant and the organic acid are synergistically configured to increase solubility of the hydrocarbon sludge upon exposure to the treatment fluid; and a mutual solvent that is soluble in oil and in water, wherein the mutual solvent is configured to dissolve at least a second portion of the organic phase of the hydrocarbon sludge, wherein the mutual solvent is configured to increase solubility of the organic acid in the composition.

In an example implementation (or aspect) combinable with any other example implementation (or aspect), the organic solvent comprises xylene, toluene, heavy naphtha, or any combinations thereof, wherein the treatment fluid comprises about 45 wt. % to about 55 wt. % of the organic solvent.

In an example implementation (or aspect) combinable with any other example implementation (or aspect), the mutual solvent comprises ethylene glycol monobutyl ether (EGBE), methanol, isopropyl alcohol, or any combinations thereof, wherein the treatment fluid comprises about 10 wt. % to about 20 wt. % of the mutual solvent.

In an example implementation (or aspect) combinable with any other example implementation (or aspect), the surfactant comprises a sulfate, a sulfonate, a phosphate, a phosphonate, or any combinations thereof, wherein the treatment fluid comprises about 0.2 wt. % to about 0.5 wt. % of the surfactant.

In an example implementation (or aspect) combinable with any other example implementation (or aspect), the organic acid comprises acetic acid, formic acid, lactic acid, or any combinations thereof, wherein the treatment fluid comprises about 5 wt. % to about 13 wt. % of the organic acid.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A composition for downhole dissolution of a hydrocarbon sludge in a subterranean formation, the composition comprising:

an organic solvent configured to dissolve at least a first portion of an organic phase of the hydrocarbon sludge;

a cationic surfactant comprising a quaternary ammonium compound;

an organic acid configured to dissolve at least a portion of an inorganic phase of the hydrocarbon sludge, wherein the surfactant and the organic acid are synergistically configured to increase solubility of the hydrocarbon sludge upon exposure to the composition, wherein the organic acid is lactic acid;

a mutual solvent that is soluble in oil and in water, wherein the mutual solvent is configured to dissolve at least a second portion of the organic phase of the hydrocarbon sludge and to increase solubility of the organic acid in the composition; and a carrier fluid comprising diesel, wherein the composition comprises:

about 45 wt. % to about 55 wt. % of the organic solvent;

about 0.2 wt. % to about 0.5 wt. % of the cationic surfactant;

about 5 wt. % to about 13 wt. % of the organic acid;

about 10 wt. % to about 20 wt. % of the mutual solvent; and about 20 wt. % to about 50 wt. % of the carrier fluid.

2. The composition of claim 1, wherein the organic solvent comprises xylene, toluene, heavy naphtha, or any combinations thereof.

3. The composition of claim 1, wherein the mutual solvent comprises ethylene glycol monobutyl ether (EGBE), methanol, isopropyl alcohol, or any combinations thereof.

4. The composition of claim 1, wherein the composition comprises:

about 45 wt. % to about 55 wt. % of the organic solvent, wherein the organic solvent comprises xylene, toluene, heavy naphtha, or any combinations thereof;

about 0.2 wt. % to about 0.5 wt. % of the surfactant;

about 5 wt. % to about 13 wt. % of the organic acid;

about 10 wt. % to about 20 wt. % of the mutual solvent, wherein the mutual solvent comprises ethylene glycol monobutyl ether (EGBE), methanol, isopropyl alcohol, or any combinations thereof; and about 20 wt. % to about 50 wt. % of the carrier fluid.

5. The composition of claim 1, wherein the composition comprises:

about 54.7 wt. % of the organic solvent, wherein the organic solvent comprises xylene, toluene, heavy naphtha, or any combinations thereof;

about 0.3 wt. % of the surfactant;

about 5 wt. % of the organic acid;

about 10 wt. % of the mutual solvent, wherein the mutual solvent comprises ethylene glycol monobutyl ether (EGBE), methanol, isopropyl alcohol, or any combinations thereof; and about 25 wt. % of the carrier fluid.

* * * * *